March 2, 1954  C. R. BACKLIN  2,670,704
THREAD CONTROL DEVICE FOR SEWING MACHINES
Filed July 11, 1951  4 Sheets-Sheet 3

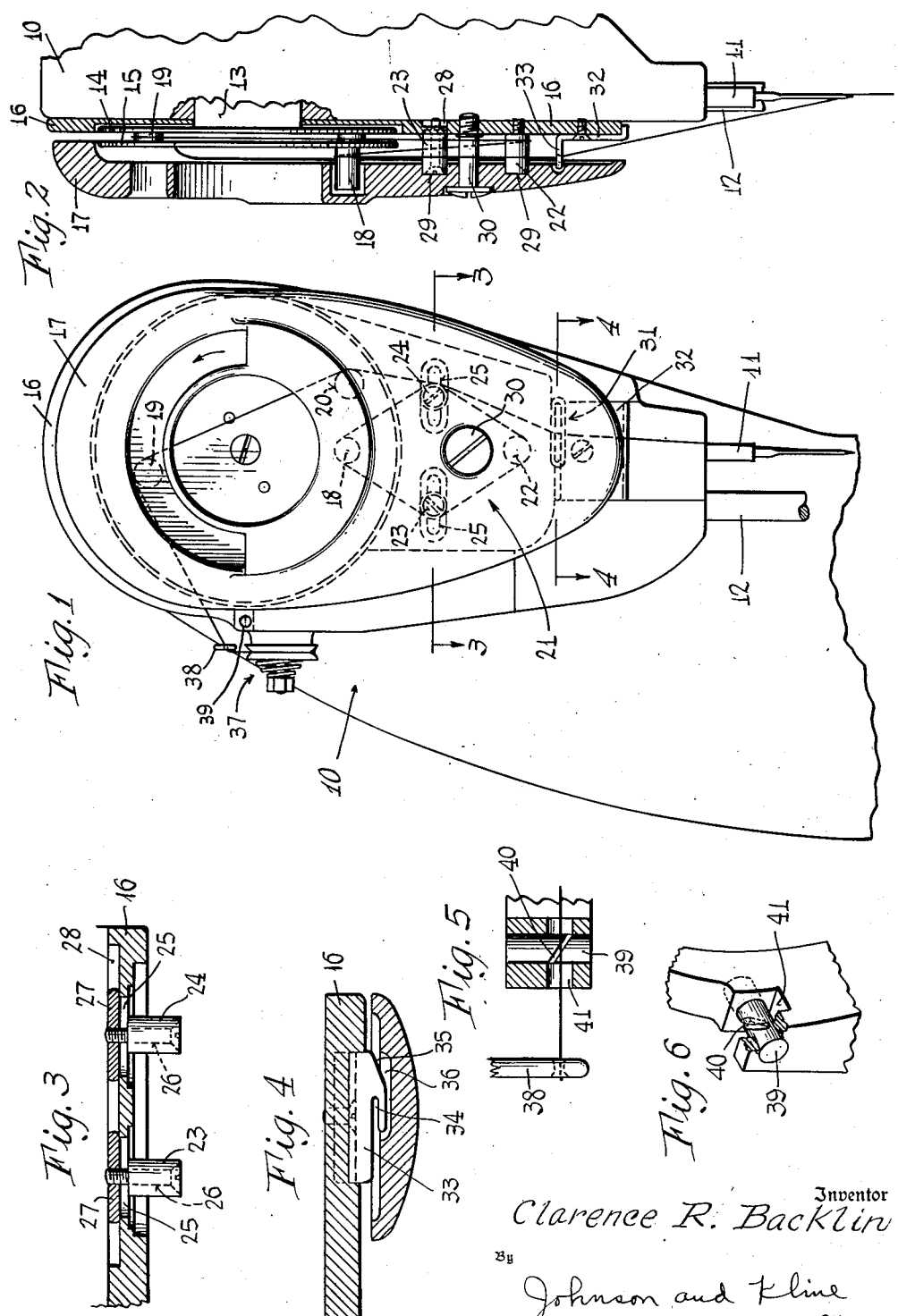

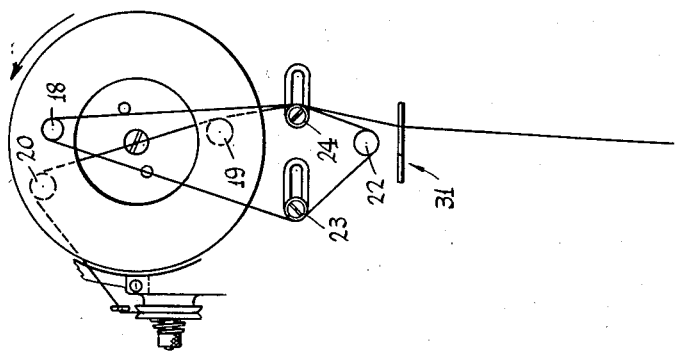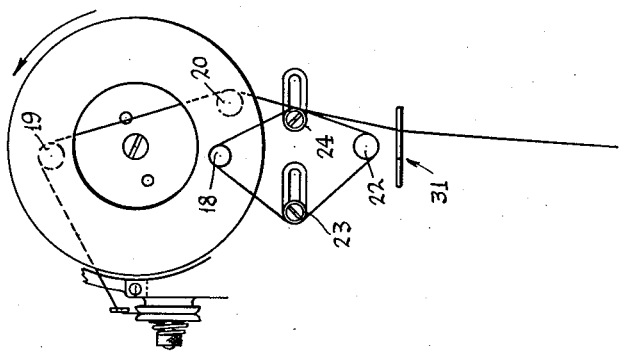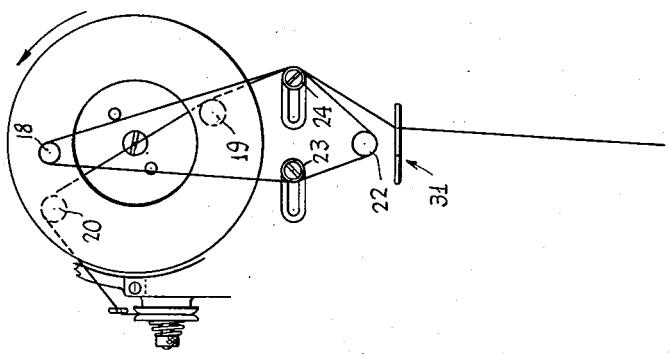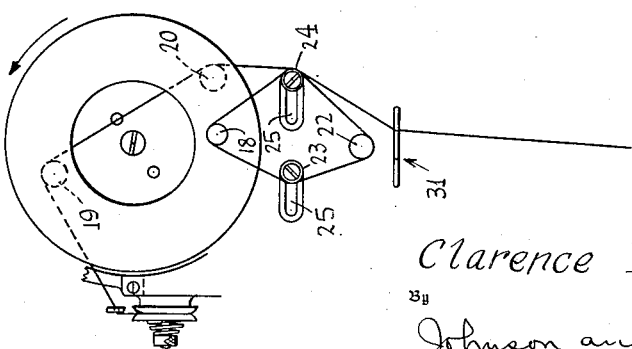

Inventor
Clarence R. Backlin
By
Johnson and Kline
Attorneys

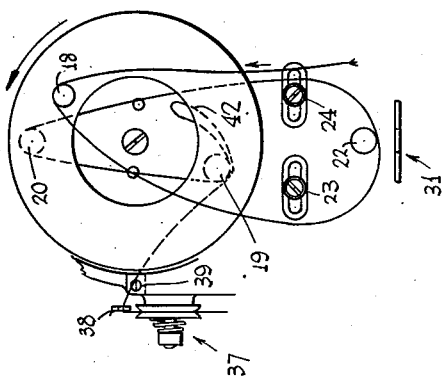
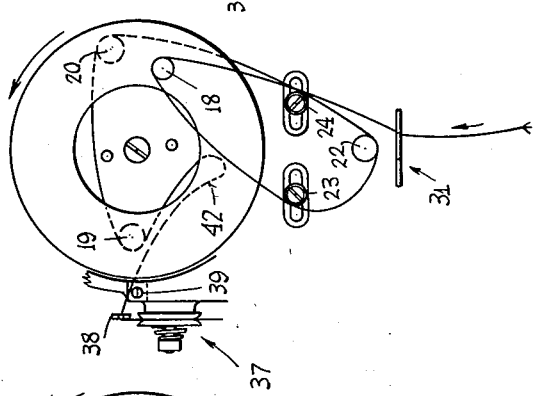
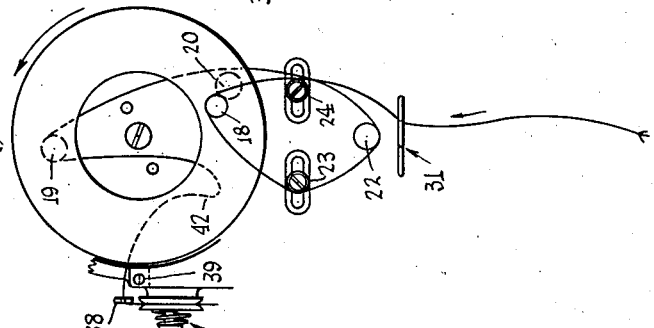
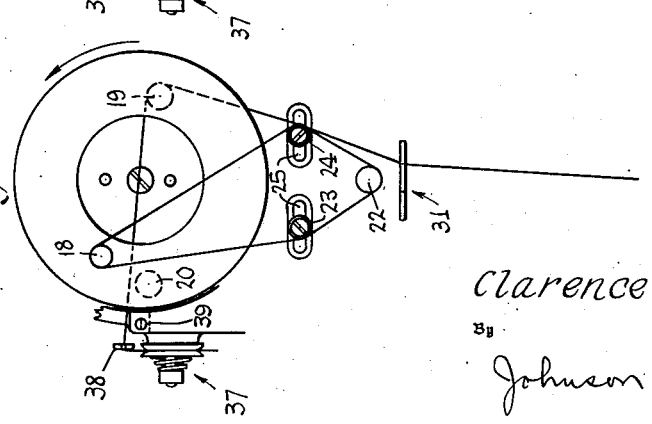
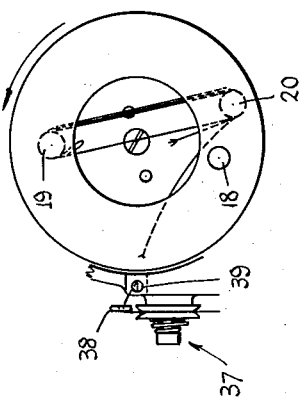
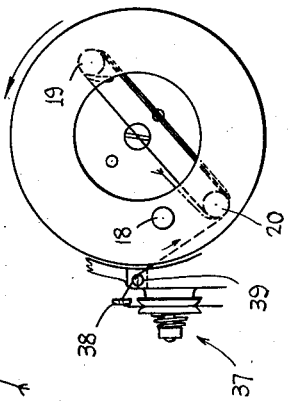
Inventor
Clarence R. Backlin
By
Johnson and Kline
Attorneys Patented Mar. 2, 1954

2,670,704

UNITED STATES PATENT OFFICE 2,670,704

THREAD CONTROL DEVICE FOR SEWING MACHINES

Clarence R. Backlin, Floral Park, N. Y., assignor to Willcox & Gibbs Sewing Machine Company, New York, N. Y., a corporation of New York Application July 11, 1951, Serial No. 236,194

11 Claims. (Cl. 112—248)

1

The present invention relates to thread control means for sewing machines and is in improvement of my prior Patent No. 2,386,678.

An object of the present invention is to provide a rotary take-up device which may be readily adjusted so as to advance or retard the take-up action with respect to the sewing cycle to compensate for various sewing threads and types and thicknesses of materials to be sewn.

Another object of the invention is to provide a rotary take-up device which may be readily adjusted to control the quantity of thread delivered for each operation of the device.

A further object of the present invention is to provide a self-threading guide in conjunction with the take-up means which is spaced laterally of the take-up means to insure proper handling of the thread in all positions of the adjustable members of the take-up means.

A still further object of the present invention is to provide the thread control means with a thread severing device which will sever the thread at the entering side of the rotary take-up in the event that the thread should become tangled and/or wrapped around the take-up device.

A feature of the invention is the use in the take-up of stationary guide means comprising a plurality of thread contacting elements, at least some of which are relatively adjustable, in lieu of the stationary spool guide of my prior patent, whereby by adjusting said elements various requirements of the sewing operation can be readily achieved and maintained.

Another feature of the invention resides in locating the thread severing device in such position that it is normally inoperative but automatically becomes operative as an incident to improper operation of the take-up.

Other features and advantages of the invention will be apparent from the specification and claims when considered in connection with the drawings in which:

Figure 1 is an end view of a sewing machine showing the thread control mechanism.

Fig. 2 is a longitudinal sectional view through the thread control means of Fig. 1.

Fig. 3 is a fragmentary sectional view taken along lines 3—3 of Fig. 1.

Fig. 4 is a fragmentary sectional view taken along lines 4—4 of Fig. 1 showing the self threading guide.

Fig. 5 is a fragmentary view showing the guide and severing means with the severing means partly in section.

Fig. 6 is a perspective view partly in section of the severing means.

2

Figs. 7 and 8 show diagrammatically the adjustable elements set for a retarded take-up.

Figs. 9 and 10 show diagrammatically the adjustable elements set for an advanced take-up.

Figure 12:
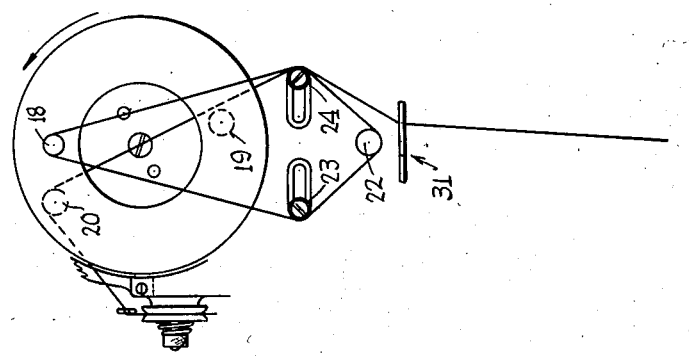
Figure 11:
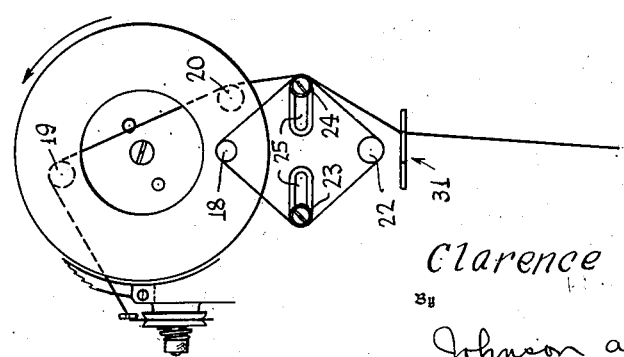

Figs. 11 and 12 show diagrammatically the adjustable elements adjusted to handle a minimum amount of thread.

Figure 14:
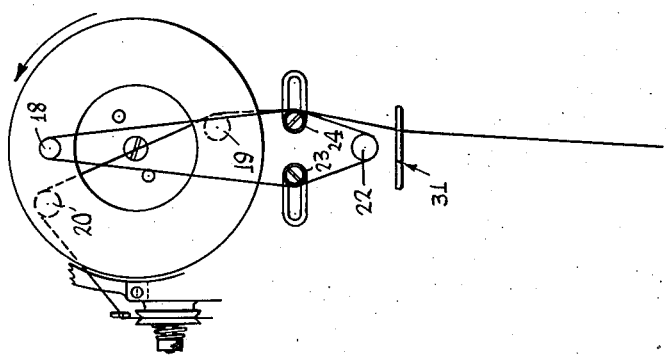
Figure 13:
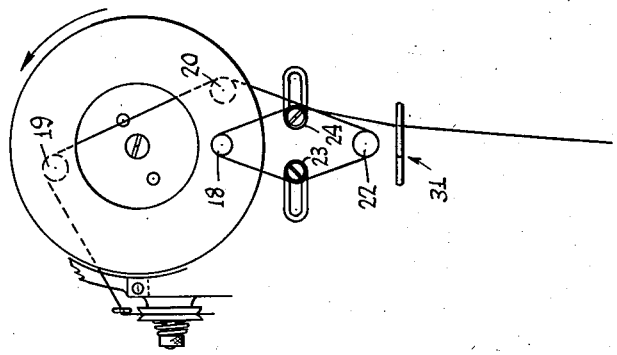

Figs. 13 and 14 show diagrammatically the adjustable elements adjusted to handle a maximum amount of thread.

Figs. 15 to 20 show diagrammatically the action of the take-up and thread severing device upon the needle thread being broken and the tension released.

Fig. 15 showing a normal operation;

Fig. 16 showing the broken thread and the release of tension on the needle thread in the take-up device;

Figs. 17 and 18 showing the wrapping of the thread and the tangling of the same about the take-up elements;

Fig. 19 showing the tangled thread being drawn across the severing device; and

Fig. 20 showing the thread severed by the severing device.

The thread control mechanism of the present invention is shown applied to the head end of the sewing machine frame 10 having the usual needle bar 11 and presser foot bar 12 carried therein for supporting the usual presser foot (not shown) which cooperates with the usual feed dogs (not shown) during the sewing cycle. The head also has a top shaft 13 which is driven in timed relation with the operation of the needle bar and feed dogs during a sewing cycle.

The thread control mechanism is generally of the type disclosed in Figs. 11 and 12 of my above patent and includes a wheel or rotating take-up fixedly secured to the end of the top shaft to be rotated therewith. The rotary take-up comprises a pair of plates 14, 15, one of which is positioned in a recess in a plate 16 secured to and forming a part of the end of the head, and the other of which is positioned under the edge of a take-up wheel guard 17 as shown in Fig. 2. On the face of the plate 15 is a main take-up control button 18 which extends into a race in the guard 17 and in the space between the two rotary plates are auxiliary take-up and control buttons 19 and 20. Adjacent the lower edge of the take-up plate is a novel stationary guide means 21 about which the thread passes as it is acted upon by the rotating take-up.

In accordance with the illustrated form of the invention, the stationary guide means comprises an outer member 22 and two inner members 23, 24 which may be of hardened steel or other material capable of withstanding the movement of the thread thereover. The outer member is fixed by having the end thereof threaded into the head plate. The inner members are located, one on each side of a center line passing through the axis of the wheel and the outer member, and hereinafter referred to as the reference line, and are so mounted in tranversely extending slots 25 that they may be adjusted relatively with respect to the outer member and more specifically laterally with respect to the said reference line.

While for some purposes, the inner members may be connected together for simultaneous adjustment, it is at present preferred to have them individually adjustable in order to secure greater versatility of the device. In the illustrated form of the invention, each of the inner guide members is clampingly mounted in the slots 25 by means of a bolt 26 passing therethrough and into a nut 27 positioned behind the head plate to ride in a groove 28 therein as is clearly shown in Fig. 3.

The stationary guide means not only serves as a part of the rotary take-up but also as the mounting means for the take-up wheel guard 17 by having the outer ends of the outer and inner guide members positioned in suitably shaped sockets 29 in the guard and the guard clamped to the head by means of a bolt 30 passing therethrough within the triangle formed by the three guide members and preferably lying on the reference line so that it will not interfere with the passage of the thread in the adjusted positions of the inner members as will be described.

In order to accurately control the thread in its operation and to insure its proper cooperation with the stationary guide means, I have provided a novel self-threading guide 31 which is shown in detail in Fig. 4. This guide engages the thread after it leaves the take-up device and, as shown in Fig. 1, is positioned laterally of the outer member 22 of the stationary guide means, in the direction of rotation of the wheel as indicated by the arrow and below the inner member 24. The guide comprises a plate 32 secured to the head plate 16, as shown in Figs. 2 and 4, and having a flange 33 provided with a notch 34 which faces in the opposite direction to the rotation of the wheel. The flange is also provided with a sloping rear surface 35 for guiding the thread into position as it is wound about the take-up in the threading operation as is fully described in my said patent. The guard is provided with a recess 36 in which the guide flange 33 projects and forms a passageway for the thread so that as the thread is wound clockwise about the device it will engage the inclined portion and be fed through the recess and into the notch 34.

It is at times desirable to alter the timing of the take-up in the sewing cycle to compensate for variations in the thread or work being sewn. While this could be accomplished by adjusting the angular position of the wheel or take-up plates with respect to the shaft, it is at present preferred to accomplish the same result by adjusting the relative positions of the stationary members of the take-up device. This is accomplished by removing the wheel guard and releasing the clamping action of the bolts 26 and nuts 27 and sliding the members 23, 24 in the slots 25 to the required position and clamping them in said position.

By properly adjusting the inner members of the stationary guide means, I am not only able to alter and more accurately control the operation of the thread take-up means to adjust its timing with respect to the sewing cycle but I can also adjust the quantity of thread handled by the take-up. Examples of the adjustment of the timing will now be described. Neutral or normal timing is illustrated in Fig. 1 wherein the members 23, 24 are located at about the midpoint of slots 25. If it is desired to retard or slow up the take-up in the sewing cycle this can be accomplished, as shown in Figs. 7 and 8, by adjusting the inner members from neutral position the same amount and in the same direction, i. e. to the extreme right of the slots, Fig. 7 showing the approximate start of the take-up action and Fig. 8 showing the approximate end of the take-up action. If it is desired to advance or speed up the take-up in the sewing cycle the members are adjusted from neutral position the same amount and in the opposite direction, i. e., to the extreme left position, as shown in Figs. 9 and 10, Fig. 9 showing the approximate start of the take-up action and Fig. 10 showing the approximate end of the take-up action.

The adjustable members can also be used for controlling the amount of thread handled by the control device for use particularly in situations of different type of materials being sewn. In both instances illustrated, the timing is shown to be a neutral timing with the members positioned equally on opposite sides of the line connecting the center of the wheel and the outer member. In situations where fine material is being sewn the members may be adjusted, as shown in Figs. 11 and 12, in opposite directions to the extreme outer positions in order to vary the amount of thread handled. The other extreme for use with heavy material is shown in Figs. 13 and 14 wherein the members 23, 24 have been moved to their innermost positions.

In the foregoing examples I have, for the purpose of simplicity, shown the extreme of each adjustment. It is to be understood, however, that the adjustments can be varied from normal to maximum for timing changes and for quantity of thread handled and that combinations of timing and quantity controls may be obtained if desired. This can be accomplished because of the individual adjustability of the inner members 23, 24.

Mounted on the head at a point where the thread leads to the take-up device is a usual tension device 37 and a guide member 38 which controls the passage of the thread into the rotary take-up member. In accordance with the present invention I have provided severing means located between the guide member and take-up member which will sever the strand in the event of improper operation of the take-up member. In the illustrated form of the invention the severing means comprises a steel rod 39 having a diagonal knife edge 40, which rod is mounted in the frame to extend across a U-shaped recess 41 therein as shown in Figs. 5 and 6 and is easily replaced with a new one, when it becomes dull and has lost its cutting edge. Referring to Figs. 15 and 16, it will be noted that the severing means is located on the frame between the guide 38 and the take-up wheel and is positioned laterally of the path in the direction of rotation of the take-up device, i. e. at a point below the path of travel of the thread from the guide member to the rotary take-up when it has the normal tension thereon between the tension device and needle so that it does not contact the thread. Immediately upon the breakage of the thread; for example at the needle, tension is suddenly released on the thread in the take-up device causing it to snap or fly up into the take-up wheel and to whip in the manner shown in Figs. 16, 17 and 18 so that a bite 42 is formed. Continued rotation of the rotary take-up as occurs before the operator can stop the machine will wind or wrap the thread about the take-up members 19, 20 in the manner shown in Fig. 19. This causes the thread to be drawn out of its normal path and downwardly into engagement with the severing means whereupon the thread is severed, as shown in Fig. 20, before it has an opportunity to wind a large quantity of thread about the elements of the take-up.

Variations and modifications may be made within the scope of the claims and portions of the improvements may be used without others.

I claim:

1. In a sewing machine having a thread control device including a rotary take-up plate driven in timed relation with the sewing cycle and provided with take-up means thereon, and a stationary guide means located at one edge of the plate and about which the thread extends during the operation of the take-up means, the improvement wherein the stationary guide means comprises a plurality of members and means mounting at least some of said members for adjustment with relation to one another and with respect to a reference line passing through the axis of rotation of the plate and the stationary guide means to alter the action of the control device during the sewing cycle of the machine.

2. In a sewing machine having a thread control device including a rotary take-up plate driven in timed relation with the sewing cycle and provided with take-up means thereon, and a stationary guide means located at one edge of the plate and about which the thread extends during the operation of the take-up means, the improvement wherein the stationary guide means comprises a fixed outer member and a pair of inner members located on opposite sides of a line passing through the axis of rotation of the plate and the outer member, said inner members being mounted for lateral adjustment with respect to said line to alter the action of the control device during the sewing cycle of the machine.

3. In a sewing machine having a thread control device including a rotary take-up plate driven in timed relation with the sewing cycle and provided with take-up means thereon, and a stationary guide means located at one edge of the plate and about which the thread extends during the operation of the take-up means, the improvement wherein the stationary guide means comprises a fixed outer member and a pair of independently adjustable inner members located on opposite sides of a line passing through the axis of rotation of the plate and the outer member, said inner members being adjustable toward or away from each other to control the amount of thread handled in the sewing cycle of the machine.

4. In a sewing machine having a thread control device including a rotary take-up plate driven in timed relation with the sewing cycle and provided with take-up means thereon, and a stationary guide means located at one edge of the plate and about which the thread extends during the operation of the take-up means, the improvement wherein the stationary guide means comprises a fixed outer member and a pair of adjustable inner members located on opposite sides of a line passing through the axis of rotation of the plate and the outer member, said inner members being adjustable in the same direction laterally of said line to control the timing of the take-up with respect to the sewing cycle of the machine.

5. In a sewing machine having a thread control device including a rotary take-up plate driven in timed relation with the sewing cycle and provided with take-up elements on the faces thereof, and a stationary guide means located at one edge of the plate and about which the thread extends as it passes from one side of the plate to the other, the improvement wherein the stationary guide means comprises a fixed outer member and a pair of adjustable inner members located on opposite sides of a line passing through the axis of rotation of the plate and the outer member, said inner members being adjustable laterally of said line toward or away from each other or in the same direction to control the amount of thread and timing of the take-up with respect to the sewing cycle of the machine.

6. In a sewing machine having a thread control device including a rotary take-up plate driven in timed relation with the sewing cycle and provided with take-up means thereon, and a stationary guide means located at one edge of the plate and about which the thread extends during the operation of the take-up means, the improvement wherein the stationary guide means comprises a fixed outer member and a pair of inner members located on opposite sides of a line passing through the axis of rotation of the plate and the outer member, said inner members being mounted for lateral adjustment with respect to said line to alter the action of the control device during the sewing cycle of the machine, and a self-threading guide engaging the thread leaving the take-up means and located adjacent the stationary guide means and below one of the inner members to control the thread.

7. In a sewing machine having a head, a thread control device having a rotary take-up plate driven in timed relation with the sewing cycle and mounted to overlie the end of the head, said take-up plate being provided with take-up means thereon, and a stationary guide means mounted on the head and located at one edge of the plate and about which the thread extends during the operation of the take-up means, the improvement wherein the stationary guide means comprises a fixed outer member secured to the end of the head and a pair of inner members located on opposite sides of a line passing through the axis of rotation of the plate and the outer member; and means mounting each of said inner members on the end of said head for independent lateral adjustment with respect to said line to alter the action of the control device during the sewing cycle of the machine, said end of the head having laterally extending slots and said means including a bolt extending through the slot for clamping the inner member to the end of the head.

8. In a sewing machine having a rotary take-up device and a fixed guide for leading the thread thereto, a thread severing means located between the guide and take-up device and in the plane of movement of the thread therebetween, said thread severing means having a fixed cutting edge positioned laterally, in the direction of rotation of the take-up device, of the path of movement of said thread during normal operation of the take-up device, said thread being moved by the take-up device during abnormal operation thereof into engagement with the cutting edge of the severing means to automatically sever the thread.

9. In a sewing machine having a tension device, a rotary take-up device, thread engaging means thereon, and a fixed guide for leading the thread from the tension device to the take-up, a thread severing means located between the guide and take-up device and in the plane of movement of the thread therebetween, said severing means having a fixed cutting edge positioned laterally, in the direction of rotation of the take-up device, of the path of movement of said thread during normal operation, the thread in the take-up device upon abnormal release of tension thereon, winding around said thread engaging means and being carried by the rotation of the take-up device into engagement with the cutting edge severing means to automatically sever the thread.

10. In a sewing machine having a thread control device including a rotary take-up plate driven in timed relation with the sewing cycle and provided with take-up means thereon, a stationary guide means located at one edge of the plate and about which the thread extends during the operation of the take-up means, and a guard plate mounted to overlie the take-up plate and stationary guide means, the improvement wherein the means for mounting the guard plate comprises a plurality of geometrically arranged members all located at one side of the take-up plate and having the ends thereof abutting the underside of the guard plate and fastening means for the guard plate passing within the geometrical arrangement of said members.

11. In a sewing machine having a thread control device including a rotary take-up plate driven in timed relation with the sewing cycle and provided with take-up means thereon, a stationary guide means located at one edge of the plate and about which the thread extends during the operation of the take-up means, and a guard plate mounted to overlie the take-up plate and stationary guide means, the improvement wherein the stationary guide means comprises a plurality of members at least some of which being adjustable with relation to one another and with respect to a reference line passing through the axis of rotation of the plate and the stationary guide means to alter the action of the control device during the sewing cycle of the machine, said plurality of members also forming the spacing means for mounting said guard plate in proper overlying relation.

CLARENCE R. BACKLIN.

References Cited in the file of this patent
UNITED STATES PATENTS

| Number | Name | Date |
|---|---|---|
| 1,242,031 | Osterhout | Oct. 2, 1917 |
| 1,460,177 | Ringe et al. | June 26, 1923 |
| 1,549,081 | Hohmann | Aug. 11, 1925 |
| 2,386,678 | Backlin | Oct. 9, 1945 |
| 2,446,245 | Rubel | Aug. 3, 1948 |